June 9, 1942.  C. J. FECHHEIMER  2,285,960
DYNAMO-ELECTRIC MACHINE
Filed Aug. 2, 1940

Inventor
Carl J. Fechheimer
By Arthur Simon
Attorney

Patented June 9, 1942

2,285,960

UNITED STATES PATENT OFFICE 2,285,960

DYNAMOELECTRIC MACHINE

Carl J. Fechheimer, Milwaukee, Wis.

Application August 2, 1940, Serial No. 349,754

5 Claims. (Cl. 171—252)

The invention relates to improvements in dynamo electric machines and is particularly applicable to large high speed turbo-generators though not limited thereto. Large high speed steam turbine-driven alternators have relatively great axial length and the conventional cooling thereof by means of air or gases presents difficulties, which will be pointed out hereinafter. The physical dimensions of such machines are greatly affected by their ability to dissipate the heat developed therein and it is therefore desirable to employ for cooling a heat conveying medium which has heat absorbing and heat transfer properties superior to those of the two gases theretofore used; namely, air and hydrogen.

It has long been recognized that liquids are more effective as cooling media than gases because (1) a given volume of fluid will absorb a greater amount of heat in a given time with a given temperature rise, and (2) the rate at which the heat from the hot body is transferred at a given temperature differential is greater for a liquid than for a gas. On the basis of the heat absorptive capacity per unit volume, i. e. the specific heat, water would be better than almost any other liquid, but water is not an electrical insulator, and furthermore it causes corrosion of the metals and particularly of the steel with which it comes in contact. Oil, on the other hand, is a good electrical insulator and does not attack metals, while its heat absorptive capacity per unit volume is about 1400 times as great as that of air or hydrogen for the same temperature rise.

The use of an insulating liquid such as transformer oil or "pyranol" for cooling the stator of turbo-alternators is particularly advantageous. If, as heretofore, air or hydrogen is used as the cooling medium, corona discharge from the winding appears at a potential above about 10,000 volts. In case of air this leads to the formation of ozone and other compounds which attack and ultimately destroy the organic insulation. In any event corona discharge is objectionable, and it can be entirely eliminated, if the stator winding is completely immersed in oil. Furthermore, on account of the higher dielectric strength of the oil it is possible to reduce the thickness of the insulation around the winding, thereby reducing the size of the stator slots, and since the oil permeates the space between the various layers of the stator coil windings and eliminates the air therebetween and is a better conductor of heat than air, the temperature difference between the winding and the surrounding iron for a given heat loss in the coils is reduced. The advantages gained by the use of oil for the cooling of the stator may therefore be summarized as follows:

1. The volume of cooling medium which needs to be circulated through the stator per unit of time may be greatly reduced, and at the same time the temperature rise of the cooling fluid may be reduced.

2. The rate of heat transfer from the active material of the machine to the cooling medium is improved, which improvement may be made use of by reducing the temperature difference between the active material and the cooling medium and by reducing the cooling surfaces of the conductors, and the surfaces of the ducts through which the cooling fluid flows in the iron. Thus, the product of the current per conductor and the number of conductors per slot may be increased.

3. The wall thickness of the insulation around the stator coils may be reduced for a given voltage. This reduction, which is accompanied by an improved heat conductivity of the insulation due to the presence of the oil, admits of a higher loading of the conductors, that is, a reduction of their cross section and also a reduction of the temperature difference between the copper and the oil. Thus, with an increase of ampere conductors per slot, or/and larger iron section in the stator teeth, the machine dimensions may be reduced.

In some cases a great advantage can be achieved by the use of oil by making it possible to wind the stator for considerably higher voltages than is practical with air or hydrogen. The highest voltage for which alternators have been wound heretofore is 33,000 volts and this voltage required very special and complicated constructions on account of the necessity of the very heavy insulation. The resulting complications, corona formation, and other disadvantages of such windings have convinced many engineers that the construction of 33,000 volt machines on conventional lines may be undesirable. By the use of oil as the cooling medium for the stators of very large machines they can be constructed satisfactorily for voltages even higher than 33,000 volts. In some cases where the transmission distance is not too great and therefore does not require too high a transmission voltage, it is then feasible to eliminate the step-up transformers between the generator and the line which voltages reduces the size of the switch gear and bus bars in the power station thereby reducing the size and cost of the entire installation.

The use of a liquid as the cooling medium for the rotor presented heretofore especially great mechanical difficulties which have been overcome by the present invention, while at the same time the liquid cooling affords greater reliability and life and a greater compactness of the machine.

In the conventional construction of high speed turbo-alternators the rotor is cooled by gas which is passed into the rotor through a series of axial ducts and which is discharged through a series of parallel radial cooling ducts, the fluid entering the axial ducts at both ends then passing through the radial ducts. As the length of the machine increases the velocity of the fluid near the entrance of the axial ducts increases thereby lowering the pressure at the entrance to the radial ducts which decreases the amount of fluid passing into and through the radial ducts, the reduction being a maximum near the ends of the rotor. Hence a relatively small amount of cooling fluid passes into the radial ducts near the ends of the rotor thereby decreasing the average cooling effect of the air passing through the machine. This phenomenon has been described and illustrated by applicant in a technical paper, attention being called to Figures 27 and 28 on pp. 491 and 493 of the Transactions of the American Institute of Electrical Engineers for 1924. While the data there disclosed referred particularly to turbo-generator stators, they are equally applicable to the rotors of such machines.

It is obvious that the cross section of the axial ducts should be increased with the length of the machines. A serious limitation thereto is imposed, as this increase reduces the cross section of the remaining steel and thus increases the stresses in the material. The volume of the rotor is principally affected by three factors: the effectiveness of the rotor cooling; the rotor stresses, and the magnetic saturation thereof. An improvement in the cooling has an important influence upon the size of the machine. The difficulties referred to in the discussion of the flow of the cooling medium through the axial ducts when using hydrogen or air do not apply when the rotor is cooled with oil by the method which will be described hereinafter. Furthermore, the proportions of winding slot to tooth width may be materially modified from that which is commonly used without materially affecting the performance of the machine. The proposed scheme may use bearing oil for cooling the rotor whereby the rotor cooling ducts are supplied with cooling oil which flows in parallel paths with the lubricating oil of the rotor bearings so that it may be cooled by passing it through the same external heat exchanger and pump which circulates the oil through the bearings.

Liquid cooling of the stators of large machines has been proposed heretofore for instance by A. B. Field in the Transactions of the First World Power Conference, volume III, 1924, but no suitable construction was developed therefor, while no practical means have been proposed for the cooling of the rotating part by means of a liquid.

An object of the present invention is therefore to provide a dynamo-electric machine of the aforementioned type which has all of its parts in which heat is dissipated cooled effectively by a liquid which for the stator has high dielectric strength such as transformer oil or a similar liquid, and for both the stator and the rotor has high specific heat, and good heat transfer properties.

Another object is to provide a machine of greater reliability and durability.

Another object is to provide a more compact machine.

Another object is to build machines for higher voltages than has been possible hitherto.

The accompanying drawing illustrates one embodiment of the invention but it will be understood that the invention is capable of various modifications.

In the drawing,

Figure 2 is a view partly in end elevation and partly in vertical cross section of the rotor along the lines of 2—2 of Figure 1, while

Figure 1:
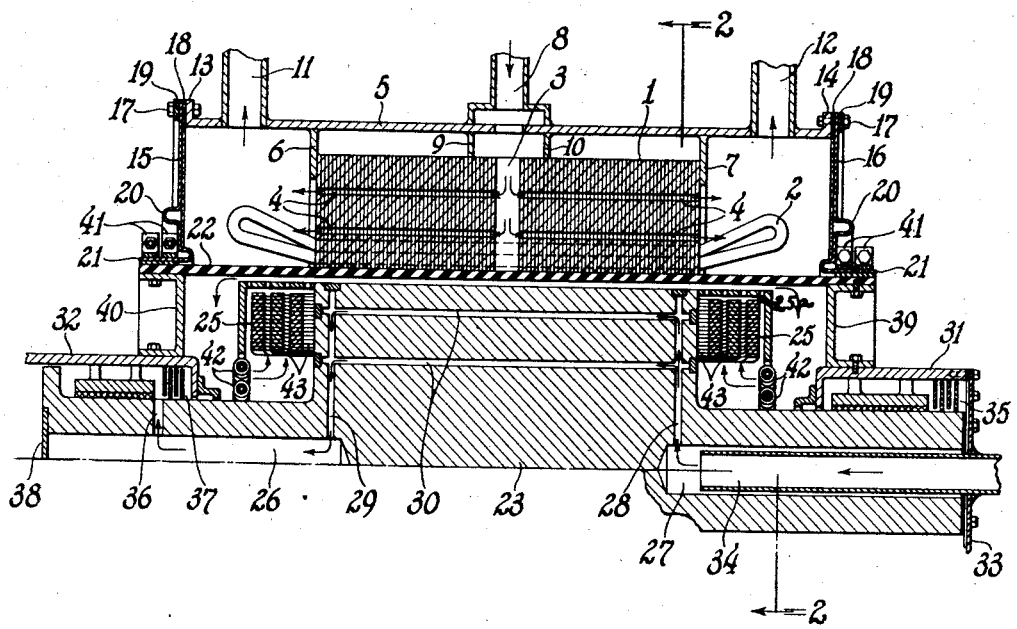
Figure 1 is a longitudinal section of a machine incorporating the invention.
Figure 2:
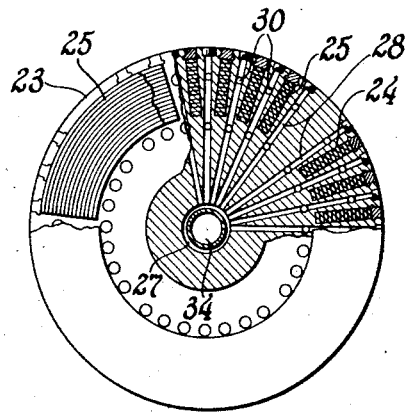

Refering to the drawing the same illustrates an alternating current generator having a stationary armature and a rotating field, the latter adapted to be coupled to a driving prime mover such as a steam turbine.

The armature comprises a substantially cylindrical stationary housing which is suitably supported and in turn supports a ring-shaped core 1 built up in the usual manner of sheets of magnetic material. The core is provided at its inner periphery with suitable slots in which the armature winding 2 is embedded. Intermediate the ends of the core the laminations are spaced apart axially by a suitable spacer to form a duct 3 from which a plurality of axial ducts 4 extend in both directions through the laminations to the respective ends of the armature core. These ducts may be arranged in circular groups at different diameters of the core, and it is particularly desirable to have a group of conduits closely adjacent to the slots for the coils 2, so as to be in good heat conducting relation to these coils and thus readily absorb the heat developed therein.

Figure 3:
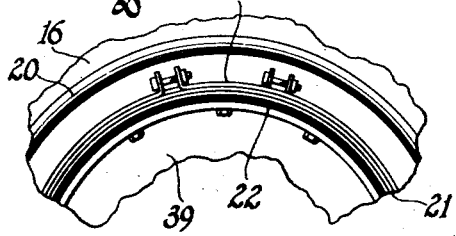
Figure 3 shows certain details as will be pointed out hereinafter.

To support the core 1, a housing 5 is provided at its inner periphery with circular flanges 6 and 7, respectively, abutting the ends of the core 1, which is clamped or otherwise fastened thereto. A second pair of circular flanges 9 and 10 form with the housing 5 and the core 1 at its center a circumferential duct 8 which is in direct communication with the duct 3. The housing 5 is further provided near each end with outlet conduits 11 and 12 respectively. The end of the frame 5 is provided with radial flanges 13 and 14 respectively, to which are fastened annular flexible diaphragms 15 and 16 by means of bolts 17, a packing ring 18 of oil resistant material being interposed between the flanges 13 and 14 and the diaphragms 15 and 16, respectively, and pressure rings 19 are interposed between the heads of the bolts 17 and the outer surface of the diaphragms 15 and 16. The diaphragms 15 and 16 may be provided with one or more circular corrugations 20 to give them greater flexibility and prevent concentration of stresses therein. The diaphragms 15 and 16 have axial flanges 21 at their inner circumference which flanges are of substantially the same diameter as the inside diameter of the core 1. A tube 22 of non-magnetic material which is also a good insulator and which has sufficient mechanical strength is fastened inside of the flanges 21 and extends through the entire length of the housing 5 and the core 1. The material for this tube may be Bakelite or similar material. It forms with the housing 5 and the diaphragms 15 and 16 a fluid-tight compartment for the core 1 and the winding 2. A preferred form of a fluid-tight connection between the diaphragms 15 and 16 and the tube 22 is shown more in detail in Figure 3 and will be more fully explained hereafter.

The use of oil for cooling the stator, due to its high dielectric strength, is particularly advantageous, as it permits the armature of the machine to be wound for very high voltages, thus often eliminating the necessity of step-up transformers. Oil further avoids corona on the winding and attack by ozone of the dielectric and thus permits use of a thinner insulating wall, making space available for more copper and thus further decreases the losses and the size of the machine.

The rotor of the machine comprises a substantially cylindrical forging 23 having an integral shaft stub at each end. The rotor is provided with radial slots 24 in which are embedded the conductors 25 of an energizing winding, in the usual manner. The shaft stubs are provided with bores 26 and 27, respectively, extending inwardly to a point from which radial conduits 28 and 29 having closed outer ends extend towards the circumference of the rotor. The rotor is also provided with axial conduits 30 which run the full length of the rotor and which connect with the conduits 28 and 29 respectively. The ends of the conduits 30 are closed by suitable plugs so that a continuous oil-tight passage is formed between the bores 26 and 27 through the conduits 28, 29 and 30 of the rotor. The rotor is supported in bearings mounted in housings 31 and 32 respectively. The outer end of the housing 31 is closed in an oil-tight manner by a circular end plate 33 through which passes a supply tube 34 and which extends into the bore 27. To prevent leakage of oil from the bore 27 around the end of the shaft and to the bearing, a labyrinth packing 35 is provided between the outer end of the shaft and the housing 31. The bore 26 is provided with a radial outlet passage 36 through which cooling oil is passed to the bearing housing 32 to pass over the bearing and out into the outer end of the housing from which it may be returned to a suitable sump (not shown). As is apparent, all centrifugal forces acting on the oil in its passage from the bore 27 to bore 26 are balanced and thus cancel each other. On the other hand the centrifugal force acting on the oil in its passage through bore 36 creates a suction which draws the oil through the cooling ducts of the rotor. To prevent leakage of oil from the passage 36 and the housing 32 into the inside of the rotor housing a labyrinth packing 37 is provided between the shaft and the inner end of the housing 32. Thus when oil under pressure is supplied through the tube 34 the same passes from the latter to the bore 27 through the radial conduits 28, the axial conduits 30, the rotor conduit 29, the bores 26 and 36 over the bearing 32 to a return passage (not shown). In order to force the oil to flow through the passage 36 the outer end of the bore 26 is closed up by a plug 38 as shown in the drawing. This end of the rotor shaft is further provided with a flange for connection to the prime mover. Annular discs 39 and 40 extend radially from the housings 31 and 32 respectively and are provided at their outer ends with axial flanges, which abut the inner circumference of the respective ends of the tube 22. As more fully shown in Figure 3 the diaphragms 15 and 16 are pressed against the flanges of the discs 39 and 40 by means of hoops 41 to form air-tight joints between the discs 39 and 40 and the tube 22 on one hand and oil-tight joints between the tube 22 and the diaphragms 15 and 16 on the other hand.

It will be noted that at each end of the rotor 23 there is thus formed a compartment for the end connection of the windings 25. These compartments are provided with stationary finned cooling tubes 42 through which water or oil may be passed. The air which is enclosed within the compartments is forced by centrifugal action through the interstices 43 of the windings 25, through the passages of a retaining ring 25a and from there passes in a closed circuit, as indicated by arrows back through the cooling tubes 42 where the heat is extracted, and thereafter the cool air again passes through the winding to cool the same effectively.

Cooling oil entering through the passage 8 of the stator passes through the ducts 3 and 4 to the outlet ducts 11 or 12, and thus effectively cools the stator. A heat exchanger and pump, external to the machine (not shown) are respectively provided to absorb the heat in the oil, and to circulate the oil.

By suitable modifications the above described methods may be applied to salient pole alternators or synchronous motors.

What I claim as new and desire to secure by Letters Patent is:

1. A dynamo-electric machine, comprising the combination with a laminated stator core provided with a winding, and having longitudinal ducts passing therethrough, and a cylindrical rotor, said rotor being provided with a winding and having at each end thereof a shaft, each shaft provided with a concentric bore, of a stator housing, an insulating tube concentric with and passing through the air gap between said core and said rotor, means forming with said tube and said stator housing a liquid tight chamber enclosing said stator and said stator winding, said means including a resilient member adapted to compensate for relative dimensional variations between said tube and said stator housing, a plurality of longitudinal ducts in said rotor, connections between said bores and the respective ends of the longitudinal ducts of said rotor and forming therewith continuous liquid tight conduits between said bores, an axial inlet for admitting a cooling liquid to one of said bores and a radial exit for the discharge of said cooling liquid in the other of said bores, said inlet and said exit being arranged to produce a hydraulic head upon a liquid in said conduits, to thereby force said liquid therethrough, inlet and outlet connections for said stator chamber adapted to pass a cooling liquid through said chamber and said stator ducts, a bearing housing at each end of said rotor, each including a bearing for the respective shaft, and means to form with said bearing housings and said insulating tube an air tight compartment for said rotor.

2. A dynamo-electric machine, comprising the combination with a laminated stator core provided with a winding, and having longitudinal ducts passing therethrough, and a cylindrical rotor, said rotor being provided with a winding and having at each end thereof a shaft, each shaft provided with a cencentric bore, of a stator housing, an insulating tube concentric with and passing through the air gap between said core and said rotor, means forming with said tube and said stator housing a liquid tight chamber enclosing said stator and said stator winding, said means including a resilient member adapted to compensate for relative dimensional variations between said tube and said stator housing, a plurality of longitudinal ducts in said rotor, connections between said bores and the respective ends of the longitudinal ducts of said rotor, and forming therewith continuous liquid tight conduits between said axial bores, an axial inlet for admitting a cooling liquid to one of said bores and a radial exit for the discharge of said cooling liquid in the other of said bores, said inlet and said exit being arranged to produce a hydraulic head upon a liquid in said conduits, to thereby force said liquid therethrough, inlet and outlet connections for said stator chamber adapted to pass a cooling liquid through said stator chamber and said stator ducts, a bearing housing at each end of said rotor, each including a bearing for the respective shaft, means to form with said bearing housings and said insulating tube an air tight compartment for said rotor, having a pocket at each end thereof, and a stationary cooler in each pocket adapted to receive a stream of cooling fluid to thereby cool the air in said compartments.

3. A dynamo-electric machine, comprising the combination with a cylindrical rotor of said machine, said rotor being provided with a winding and having at each end thereof a shaft, each shaft provided with a concentric bore, of a stationary insulating tube concentric with and surrounding said rotor, a bearing housing at each end of said rotor, including a bearing for the respective shaft, a plurality of longitudinal ducts in said rotor, connections between said concentric bores and the respective ends of said longitudinal ducts and forming therewith continuous liquid tight conduits between said bores, an axial inlet for admitting a cooling liquid to one of said bores, a radial exit for the discharge of said cooling liquid into the corresponding bearing housing in the other of said bores, said inlet and said exit being arranged to produce a hydraulic head upon a liquid in said conduit, to thereby force said liquid therethrough, and means to form with said bearing housings and said insulating tube an air-tight compartment for said rotor.

4. A dynamo-electric machine, comprising the combination with a cylindrical rotor of said machine, said rotor being provided with a winding and having at each end thereof a shaft, each provided with a concentric bore, of a stationary insulating tube concentric with and surrounding said rotor, a plurality of longitudinal ducts in said rotor, connections between said concentric bores and the respective ends of said longitudinal ducts and forming therewith continuous liquid tight conduits between said bores, an axial inlet for admitting a cooling liquid to one of said axial bores, a radial exit for the discharge of said cooling liquid in the other of said bores, said inlet and said exit being arranged to produce a hydraulic head upon a liquid in said conduit to thereby force said liquid therethrough, a bearing housing at each end of said rotor including a bearing for the respective shaft, means to form with said bearing housings and said insulating tube an air-tight compartment for said rotor, having a pocket at each end thereof, and a stationary cooler in each pocket, adapted to receive a stream of cooling fluid to thereby cool the air in said compartment.

5. A dynamo-electric machine, comprising the combination with a cylindrical rotor of said machine provided with a winding and having at each end thereof a shaft, each provided with a concentric bore, of a stationary insulating tube concentric with and surrounding said rotor, a plurality of longitudinal ducts in said rotor, connections between said concentric bores and the respective ends of said longitudinal ducts and forming therewith continuous liquid tight conduits between said bores, an axial inlet connection for admitting a cooling liquid to one of said axial bores and a substantially radial exit hole for the discharge of said cooling liquid extending from the other of said bores through the wall of the respective shaft, for producing an hydraulic head upon a liquid in said conduit to thereby force said liquid therethrough, a bearing housing at each end of said rotor including a bearing for the respective shaft, means to form with said bearing housings and said insulating tube an air-tight compartment for said rotor, having a pocket at each end thereof, a stationary cooler in each pocket, adapted to receive a stream of cooling fluid to thereby cool the air in said compartment, and means to circulate the air in said pockets over said cooler and the part of the winding extending into said pockets.

CARL J. FECHHEIMER.